No. 750,636. Patented January 26, 1904.

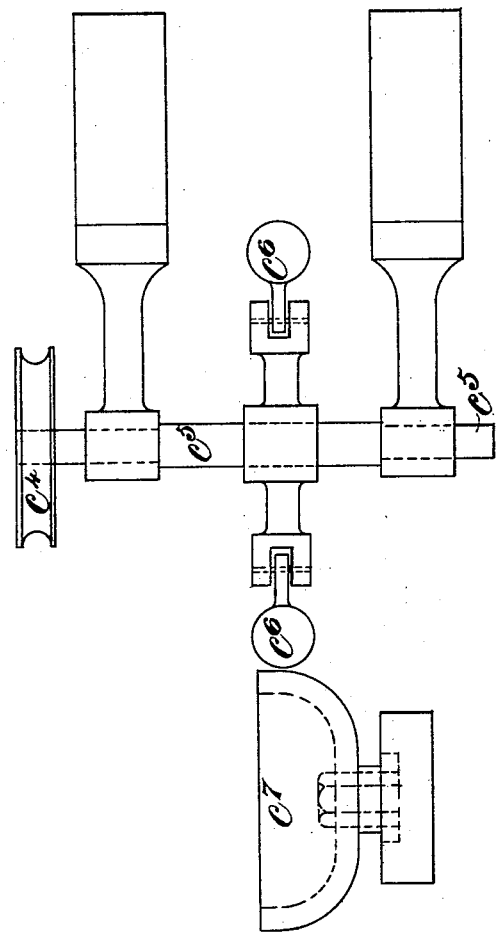

UNITED STATES PATENT OFFICE.

NAROTTAM MORARJEE GOCULDAS AND KAKHUSROO SORABJI IRANI, OF BOMBAY, INDIA.

ALARM FOR ROAD-VEHICLES.

SPECIFICATION forming part of Letters Patent No. 750,636, dated January 26, 1904.

Application filed June 18, 1903. Serial No. 162,017. (No model.)

*To all whom it may concern:*

Be it known that we, NAROTTAM MORARJEE GOCULDAS, a resident of Peddar Road, Bombay, and KAKHUSROO SORABJI IRANI, a resident of Sholapur, Bombay Presidency, India, subjects of the Emperor of India, have invented a certain new and useful Alarm for Road-Vehicles, (for which we have filed application for British Patent No. 28,477, dated December 24, A. D. 1902;) and we do hereby declare the following to be a full, clear, and exact description of the invention, such as will enable others skilled in the art to which it appertains to make and use the same.

Our said invention has for its object an improved alarm for road-vehicles the motion for operating which is derived from one of the wheels of the vehicle.

Figure 1:
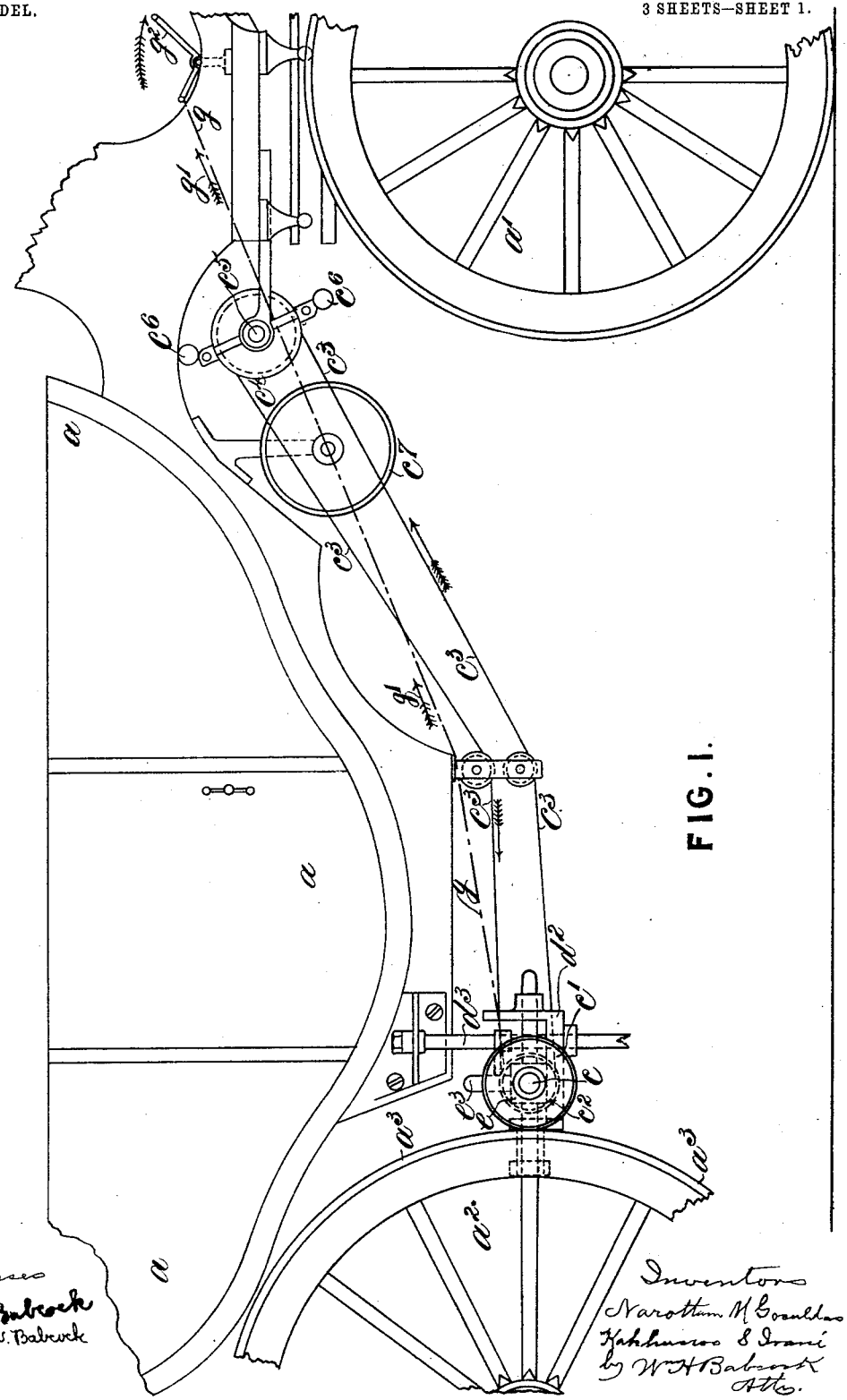
Figure 2:
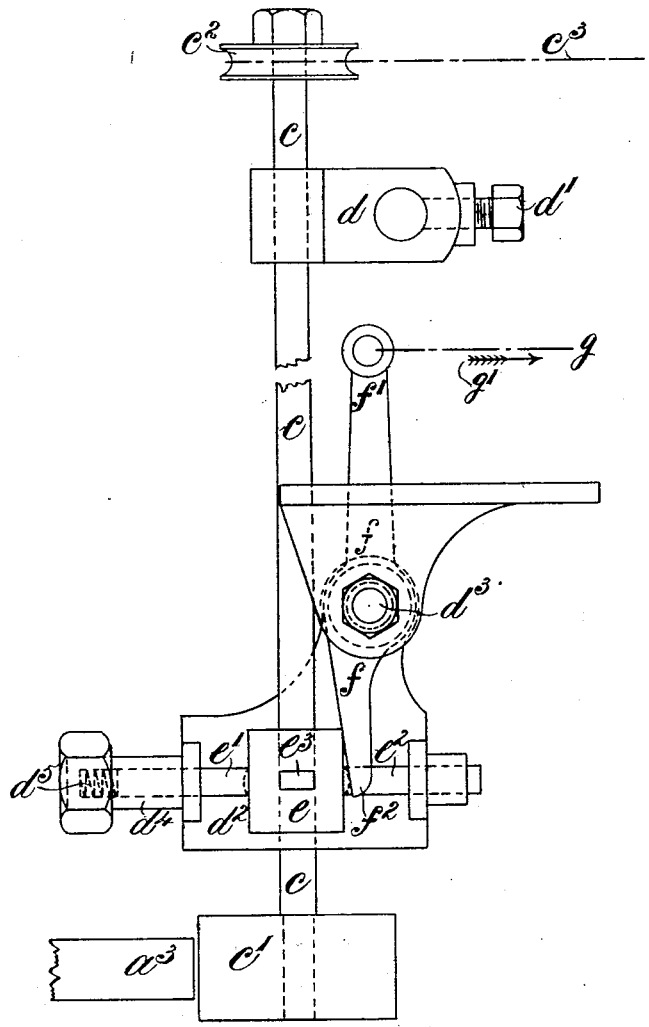

In the drawings, Figure 1 is a side elevation showing so much only of a carriage as is needed to explain the application thereto of the invention, which in this example derives its motion from the tire of the wheel. Fig. 2 is a plan to a larger scale of that part of the apparatus by means of which the operation of the alarm is started and interrupted. Fig. 3 is a plan also to a larger scale of the device for sounding the alarm.

Referring first to Figs. 1, 2, and 3, where the motion is derived from the tire of one of the wheels, $a$ is the carriage-body. $a'$ is the front wheel. $a^2$ is the rear wheel, from the tire $a^3$ of which the motion for operating the gong is derived when required. A shaft $c$ is mounted parallel to the axle of the wheel $a^2$. The far end of the shaft $c$ runs in a bracket $d$ with so much play as to permit of the nearest end carrying a friction-wheel $c'$ to be slid to and from the tire of the wheel. The bracket $d$ is secured by a set-screw $d'$ to a rod depending from the body of the carriage. The nearest end of the shaft $c$ is mounted in a slide-block $e$, borne by the bracket $d^2$, secured to a bolt $d^3$. The slide-block $e$ has guide-pins $e'$ $e^2$. The guide-pin $e'$ works in guide-bearings on the bracket $d^2$. The guide-bearings $d^4$ have an internal spring $d^5$, normally tending to push the friction-wheel $c'$ away from the felly of the wheel. Fulcrumed on the bolt $d^3$ is a lever $f$, to one end $f'$ of which is attached a cord or wire $g$, under the control of the driver of the vehicle. When the cord is tugged in the direction of the arrow $g'$, the other arm $f^2$ presses against a projection $e^3$ on the slide-block $e$, and bringing the latter up so as to compress the spring $d^5$ the friction-wheel $c'$ is brought into rolling contact with the tire of the wheel. The tug of the cord $g$ is produced by pressure of the driver's foot on the lever $g^2$. The rotation of the shaft $c$ is transmitted, by means of a pulley $c^2$ and an endless cord $c^3$, to a pulley $c^4$, which drives the shaft $c^5$, carrying the centrifugal hammers $c^6$. These latter in their revolution strike the gong $c^7$.

What we claim as our invention, and desire to secure by Letters Patent, is—

In combination with a transporting-wheel of a vehicle, a friction-wheel bearing thereon, a shaft carrying said friction-wheel at one end and having so much play as to permit said friction-wheel to be moved into and out of contact with said transporting-wheel at will, a slide-block $e$ in which one end of said shaft is mounted and which is provided with guide-pins $e'$ $e^2$, a bracket $d^2$ having guide-bearings for said pins, a spring $d^5$ arranged in one of the said guide-bearings and normally holding the friction-wheel out of contact, a lever bearing on a part of the said slide-block and arranged to be operated by the driver to force the said friction-wheel into contact, an alarm, and connections between it and the shaft of the friction-wheel substantially as set forth.

In witness whereof we have hereunto set our hands in the presence of two witnesses.

NAROTTAM MORARJEE GOCULDAS.
KAKHUSROO SORABJI IRANI.

Witnesses:
JEHANGIR M. RUTNAGOR,
WM. THOS. FEE.